United States Patent [19]
Pignataro

[11] Patent Number: 6,002,317
[45] Date of Patent: Dec. 14, 1999

[54] ELECTRICALLY SWITCHABLE MAGNET SYSTEM

[75] Inventor: Dominic F. Pignataro, Shrewsbury, Mass.

[73] Assignee: Walker Magnetics Group, Inc., Worcester, Mass.

[21] Appl. No.: 09/059,451

[22] Filed: Apr. 13, 1998

[51] Int. Cl.⁶ ........................................................ H01F 7/20
[52] U.S. Cl. ........................ 335/289; 335/291; 335/285
[58] Field of Search .................................. 335/177–179, 335/182–184, 222, 229, 230–234, 236, 285–291, 274

[56] References Cited

U.S. PATENT DOCUMENTS

| | | | |
|---|---|---|---|
| 3,316,514 | 4/1967 | Radus et al. . | |
| 3,671,893 | 6/1972 | Edgar et al. | 335/179 |
| 3,673,529 | 6/1972 | Garratt et al. | 335/234 |
| 3,914,723 | 10/1975 | Goodbar | 335/78 |
| 4,075,589 | 2/1978 | Braillon . | |
| 4,090,162 | 5/1978 | Cardone et al. . | |
| 4,250,478 | 2/1981 | Cardone et al. . | |
| 4,356,467 | 10/1982 | Cardone et al. . | |
| 4,507,635 | 3/1985 | Cardone et al. . | |
| 4,649,359 | 3/1987 | Doki et al. | 335/222 |
| 4,837,540 | 6/1989 | Michele et al. . | |
| 4,847,582 | 7/1989 | Cardone et al. . | |
| 4,956,625 | 9/1990 | Cardone et al. . | |
| 5,745,019 | 4/1998 | Renger | 335/222 |

FOREIGN PATENT DOCUMENTS

2 038 560A  10/1979  United Kingdom .

*Primary Examiner*—Lincoln Donovan
*Attorney, Agent, or Firm*—Henry D. Pahl, Jr.; Peter J. Manus

[57] ABSTRACT

In the switchable magnet system disclosed herein, a central pole piece is backed by at least two permanent magnets having substantially different energies ($H_c$) so that one of the magnets is relatively switchable or reversible and the other is not. A magnetically permeable frame provides a peripheral pole face at least on either side of the central pole face and a backing plate bridging the central pole piece over the permanent magnets. A coil surrounds the first and second permanent magnets inside of the peripheral pole face. According, energization of the coil in one direction can reverse the polarization of the first magnet, thereby effectively short circuiting flux produced by the second magnet and terminating holding, while energization of the coil in the opposite direction can polarize the first magnet in parallel with the second magnet, thereby to effect holding.

5 Claims, 1 Drawing Sheet

ELECTRICALLY SWITCHABLE MAGNET SYSTEM

BACKGROUND OF THE INVENTION

The present invention relates to a switchable holding magnet system and more particularly to a system which employs permanent magnets but can be switched from a holding state from a non-holding state.

While various systems have been proposed in which a holding magnet system powered by permanent magnets can be switched from a holding to a non-holding state, these prior art systems have been relatively complex and difficult to assemble and or energized. Typically, these prior art systems have involved magnets of different types with coils around only the magnets of one type.

Among the several objects of the present invention may be noted the provision of a novel holding magnetic system which is switchable between holding and non-holding states; the provision of such a system which can be electrically switched between the holding and non-holding states; the provision of such a system which is simple to construct and to energize; the provision of such a system which is easy to assemble; the provision of such a system which is highly reliable and which is of relatively simple and inexpensive construction. Other objects and features will be in part apparent and in part pointed out hereinafter.

SUMMARY OF THE INVENTION

In the switchable holding magnet system of the present invention, a central pole piece provides a central pole face. A magnetically permeable frame provides a peripheral pole face at least on either side of the central pole face together with a backing plate bridging the central pole Piece. Between the backing plate and the central pole piece are provided a first, switchable permanent magnet and a second permanent magnet, the second permanent magnet having an energy ($H_c$) which is substantially higher than that of the first permanent magnet. A coil surrounds the first and second permanent magnets inside of the peripheral pole face. Accordingly, energization of the coil in one direction can reverse the polarization of the first magnet and thereby effectively short circuit flux produced by the second magnet and terminate holding. Correspondingly, energization of the coil in the opposite direction can polarize the first magnet in parallel with the second magnet thereby to effect holding.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
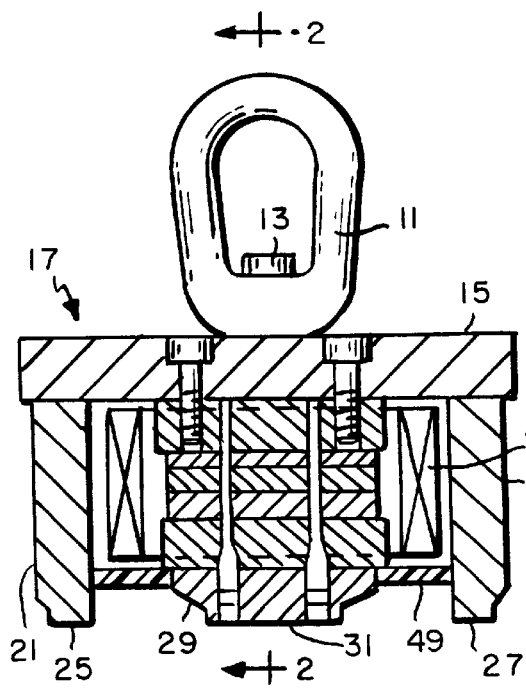
FIG. 1 is an end view of a switchable holding magnet system in accordance with the present invention, parts being broken away.
Figure 2:
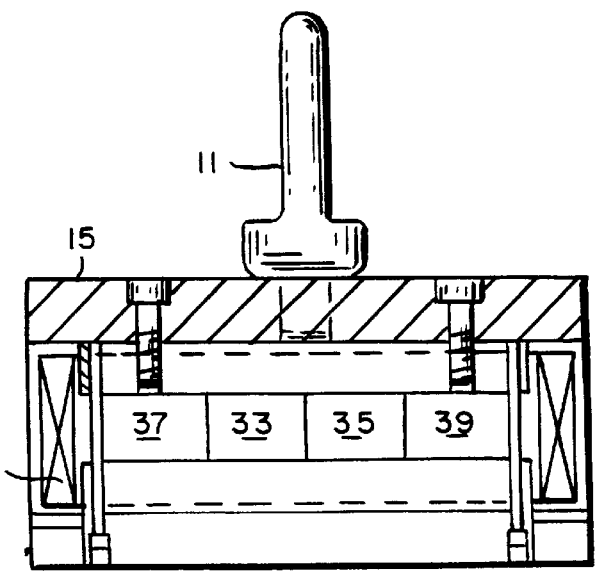
FIG. 2 is a side view, in section, of the magnet system of FIG. 1, taken substantially on the line 2—2 of FIG. 1.
Figure 3:
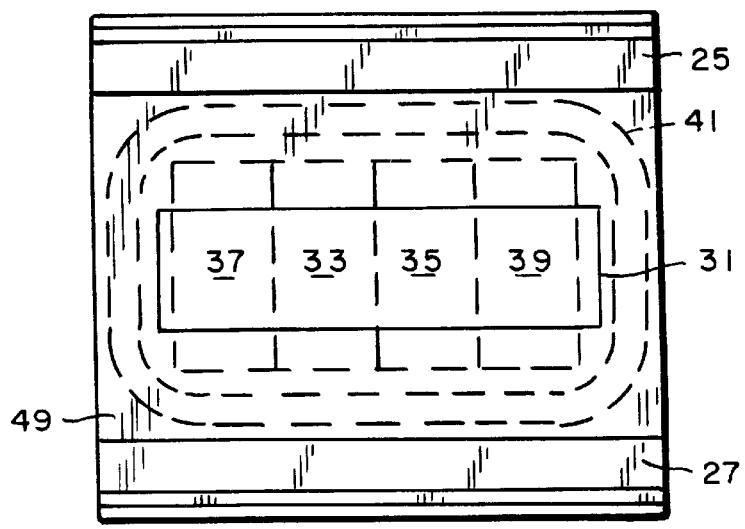
FIG. 3 is a bottom view of the holding magnet system of FIG. 1.

Referring now to FIGS. 1 and 2, the magnet system illustrated there is configured as a lifting magnet and, to this end, includes a lifting eye 11 secured by a bolt 13 to a backing plate 15. It should be understood, however, that the principles of the present invention may be also applied to switchable magnet systems arranged in different orientations and configurations, e.g. for holding a workpiece on a machine tool, or holding a mold on a plastic injection machine.

Backing plate 15 is part of a magnetically permeable frame, designated generally by reference character 17, which also includes lateral or peripheral pole pieces 21 and 23. The peripheral pole pieces 21 and 23 may be assembled to the backing plate 15 by welding or by bolts (not shown). The lateral pole pieces 21 and 23 terminate, respectively, in peripheral pole face portions 25 and 27. While the pole face portions 25 and 27 are elongate in the embodiment illustrated, as explained hereinafter, a circular or other surrounding shape pole face might also be employed.

A central pole piece 29, located between the pole pieces 21 and 22, provides an elongate central pole face 31 which is preferably co-planar with the pole faces 25 and 27. It should be understood that the endplates could also be added to form a complete rectangular periphery around the central pole face.

Between the central pole piece 29 and the backing plate 15 are located permanent magnets of two different types, spaced along the longitude axis of the central pole piece 29.

Referring now to FIG. 2, permanent magnets 33 and 35 are constructed of a material, e.g. alnico, having a relatively low energy ($H_c$). Accordingly, these magnets are relatively easily switchable or reversible in polarity. Permanent magnets 37 and 39 are constructed of a permanent magnet material having an energy ($H_c$) which is substantially higher than that of the magnets 33 and 35. For example, the magnets 37 and 39 may be constructed of a neodymium alloy such as that sold under the tradename Crumax 3520. As is understood by those skilled in the art such magnetic materials strongly resist reversal of their magnetic polarization. All of the permanent magnets are surrounded by a single coil 41. The coil is protected by an apertured plate 49 constructed of a non-magnetic material. As will be understood, this provides a very simple mechanical assembly as compared with prior art designs.

Initially, all of the permanent magnets are charged in the same direction e.g. by an external magnetic charging circuit as is customary in the art. However, by applying an appropriately polarized DC current to the coil 41, the direction of polarization of the alnico magnets 33 and 35 can be reversed so that they effectively short circuit the flux (magnetic potential) produced by the magnets 37 and 39. In this way holding is effectively terminated.

Conversely, the application of direct current in the opposite direction to coil 41 can repolarize the magnets 33 and 35 in the same direction of the magnets 37 and 39. Thus, all of the magnets will then aid in producing a magnetic potential between the central pole face 31 and the peripheral pole faces 25 and 27.

While the embodiment illustrated herein employs an elongate central pole face 31 with elongate peripheral pole faces 25 and 27 on either side, it will be understood by those skilled in the art that the principles of the present invention may be straightforwardly applied to a circular magnetic system in which the central pole face is circular and is surrounded by an annular, peripheral pole face.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A switchable holding magnet system comprising:

a central pole piece providing a central pole face;

a magnetically permeable frame providing a peripheral pole face at least on either side of said central pole face and a backing plate bridging said central pole piece;

between said backing plate and said central pole piece,
a first, switchable permanent magnet and,
beside said first permanent magnet, a second permanent magnet having an energy (Hc) which is substantially higher than that of said first permanent magnet; and a coil surrounding both said first and second permanent magnets inside of said peripheral pole face;

whereby energization of said coil in one direction can reverse the polarization of said first magnet and thereby effectively short circuit flux produced by said second magnet and terminate holding while energization of said coil in the opposite direction can polarize said first magnet in parallel with said second magnet thereby to effect holding.

2. A switchable holding magnet system as set forth in claim 1 wherein said first magnet is an alnico alloy.

3. A switchable holding magnet system as set forth in claim 1 wherein said second magnet is a neodymium alloy.

4. A switchable holding magnet system comprising:

magnetically permeable means providing a pair of elongate parallel pole faces;

a central pole piece providing an elongate central pole face parallel to and coplanar with said pair of pole faces;

magnetically permeable frame means bridging between said pair of pole faces;

between said frame and said central pole piece,
a first, switchable permanent magnet and,
beside said first permanent magnet, a second permanent magnet having an energy (Hc) which is substantially higher than that of said first permanent magnet; and a coil surrounding both said first and second permanent magnets;

whereby energization of said coil in one direction can reverse the polarization of said first magnet and thereby terminate holding while energization of said coil in the opposite direction can polarize said first magnet in parallel with said second magnet thereby to effect holding.

5. A switchable holding magnet system as set forth in claim 4 wherein said first magnet is an alnico alloy and said second magnet is a neodymium alloy.

* * * * *

UNITED STATES PATENT AND TRADEMARK OFFICE
CERTIFICATE OF CORRECTION

PATENT NO. : 6,002,317
DATED : December 14, 1999
INVENTOR(S) : Dominic F. Pignataro Page 1 of 1

It is certified that error appears in the above-identified patent and that said Letters Patent is hereby corrected as shown below:

<u>Claims:</u>
<u>Column 3,</u>
Line 10, after "magnet" insert -- with an energy (Hcl) less than 800 oersteds --.
Line 12, after "Hc" insert -- 2 --.
Lines 12-13, delete "which is substantially higher than that of said first permanent magnet".
Line 13, before the semicolon (;), insert -- of at least 8,000 oersteds --.

<u>Column 4,</u>
Line 10, after "magnet" insert -- with an energy (Hc1) less than 800 oersteds --.
Line 12, after "Hc" insert -- 2 --.
Lines 12-13, delete "which is substantially higher than that of said first permanent magnet".
Line 13, before the semicolon (;), insert "of at least 8,0000 oersteds".

Signed and Sealed this

Twenty-first Day of August, 2001

Attest:

*Nicholas P. Godici*

NICHOLAS P. GODICI
*Attesting Officer*     *Acting Director of the United States Patent and Trademark Office*